United States Patent [19]

Lemon et al.

[11] Patent Number: 4,468,359
[45] Date of Patent: Aug. 28, 1984

[54] FOUNDRY MOULDS AND CORES

[75] Inventors: Peter H. R. B. Lemon, Romsey; Jeffrey D. Railton, Southampton; Peter R. Ludlam, North Romsey; Timothy J. Reynolds, Southampton, all of England

[73] Assignee: Borden (UK) Limited, Southampton, England

[21] Appl. No.: 440,278

[22] Filed: Nov. 9, 1982

[30] Foreign Application Priority Data

Feb. 9, 1982 [GB] United Kingdom ............... 8203686

[51] Int. Cl.$^3$ ........................... C08K 3/36; C08K 3/34
[52] U.S. Cl. ...................................... 264/82; 523/145
[58] Field of Search .................. 523/145; 264/82, 221; 164/12

[56] References Cited

U.S. PATENT DOCUMENTS

| | | | |
|---|---|---|---|
| 3,234,159 | 2/1966 | Cooper | 523/145 |
| 3,599,433 | 8/1971 | Murata et al. | 405/264 |
| 3,696,622 | 10/1972 | Tohma et al. | 405/264 |
| 3,720,642 | 3/1973 | Junger et al. | 523/145 |

FOREIGN PATENT DOCUMENTS 1065605 9/1959 Fed. Rep. of Germany .
50-130627 10/1975 Japan .
2059972A 4/1981 United Kingdom .

OTHER PUBLICATIONS

Chem. Abst. 84, 125183c, (1976).

*Primary Examiner*—Lewis T. Jacobs
*Attorney, Agent, or Firm*—Robbins & Laramie

[57] ABSTRACT

A foundry moulding composition comprising (a) a granular refractory material, and (b) from 0.5% to 8% based on the weight of the refractory material of a binder comprising (i) an aqueous solution of a potassium alkali phenol-formaldehyde resin, said aqueous solution having a solids content of from 50% to 75% and said resin having a weight average molecular weight ($\overline{M}_w$) of from 600 to 1500, a formaldehyde:phenol molar ratio of from 1.2:1 to 2.6:1 and a potassium hydroxide:phenol molar ratio of from 0.2:1 to 1.2:1 and (ii) at least one silane in an amount of from 0.05% to 3% based on the weight of said aqueous solution, said binder being curable by contact therewith of from 5% to 60% based on the weight of said aqueous solution of a $C_{1-3}$ alkyl formate.

14 Claims, No Drawings

FOUNDRY MOULDS AND CORES

BACKGROUND OF THE INVENTION

This invention relates to the manufacture of foundry moulds and cores which do not evolve pungent acid gases on thermal decomposition. More particularly it refers to a method of making moulds and cores of this type rapidly at ambient temperature.

Phenol formaldehyde and phenol formaldehyde/furfuryl alcohol condensation products catalyzed with strong acids such as sulphuric acid, paratoluene sulphonic acid, are well known as binders for sand in the production of foundry moulds and cores. However, they have the disadvantage that pungent fumes of sulphur dioxide are evolved on thermal decomposition.

The use of alkaline phenolic resins catalyzed with esters has been suggested in Japanese Patent Publication No. 130627/1975 and is the subject of co-pending U.S. Application Ser. No. 224,131, filed Jan. 12, 1981, now U.S. Pat. No. 4,426,467, issued Jan. 17, 1984 and U.S. Ser. No. 434,462 filed Oct. 14, 1982, now abandoned. The use of such binder systems enables the manufacture of foundry moulds and cores which do not evolve pungent acid gases on mixing or during casting. Further, by suitable selection of resins and ester catalysts rapid hardening at ambient temperature can be achieved. However, to obtain such results on a large scale it is necessary to use specialized rapid mixing equipment such as that described in British patent specification Nos. 1257181 and 1369445 of Baker Perkins.

The present invention is based on the discovery that the use of esters as catalysts for alkaline phenolic resins in the manufacture of foundry moulds and cores can be adapted to a gassing system which is capable of rapid cure at ambient temperature. The use of gassing to promote curing of binders for foundry moulds and cores is known. The major systems which are or have been industrially used are as follows:

(a) The "Carbon Dioxide Process" in which $CO_2$ is passed through a mixture of sand and sodium silicate. However, the resultant cores or moulds are very sensitive to water and lose strength "damp back" on storage, will not accept aqueous washes and show very poor breakdown on casting. It is necessary to add breakdown agents such as sucrose to promote better breakdown. Over-gassing produces very poor strengths.

(b) The "Sulphur Dioxide Process" disclosed by SAPIC in British Pat. No. 1,411,975 which uses (1) a peroxide which is dangerous to store and dispense, particularly in a foundry environment, and (2) pungent $SO_2$ which has a low Threshold Limit Value (TLV) and is unpleasant to handle.

(c) The "Isocure" process disclosed by Ashland in British Pat. No. 1,190,644 which uses a benzilic ether phenolic polyol and methylene diphenyl diisocyanate. The reaction between the polyol and diisocyanate is accelerated by gassing with triethylamine or dimethyl ethylamine. The diisocyanates have very low TLV's and react with water preferentially over the polyol so that it is necessary to use dry sand and dry air to convey the sand/binder mix into core box or mould. The amines have relatively low TLV's and their toxicology is not well understood. Cured cores tend to absorb water and lose some strength on storage. Certain casting defects are observed with "Isocure" cores/moulds, e.g. "pinholing" caused by the nitrogen content of the binder which reduces to ammonia in the casting environment, dissolves in the molten metal, and is evolved as small blow holes on cooling; "graphitic defect" which is a deposit of graphite carbon which collects in flakes on the surface of the casting; and "finning" or "veining" caused by the mould or core cracking under the expansion stresses during casting and molten metal running into the cracks.

The present invention enables the rapid and efficient production of foundry moulds and cores without the disadvantages of the prior art as described above.

SUMMARY OF THE INVENTION

Accordingly, the present invention provides a method of making a foundry mould or core which method comprises mixing a granular refractory material with from 0.5 to 8% of a binder which comprises an aqueous solution, having a solids content of from 50 to 75% by weight, of a potassium alkali phenol-formaldehyde resin having the following characteristics:

(a) a weight average molecular weight ($\overline{M}_w$) of from 600 to 1500;

(b) a formaldehyde: phenol molar ratio of from 1.2:1 to 2.6:1; and (c) a KOH: phenol molar ratio of from 0.2:1 to 1.2:1, the binder including from 0.05 to 3% by weight based on the weight of the resin solution of at least one silane, forming the mixture in a vented core or mould box and gassing the formed mixture with at least one $C_1$ to $C_3$ alkyl formate to cure the binder.

DETAILED DESCRIPTION OF THE INVENTION

The granular refractory materials used in the present invention may be of any of the refractory materials employed in the foundry industry for the production of moulds and cores, such as silica sand, chromite sand, zircon or olivine sand. The compositions of the invention have the particular advantage that the difficulties commonly associated with the bonding of sands of alkaline reaction such as olivine and chromite or beach sands containing shell fragments and which arise from the neutralization or partial neutralization of the acid catalyst used, are completely overcome since in the invention the binder is cured under alkaline conditions. The invention is, therefore, of particular utility where it is necessary or desirable to employ alkaline sands.

The nature of the phenol-formaldehyde resin used is an important feature of the present invention. There are several features of the resin which are important. Since the present invention is directed to cold set techniques, the resin binder will be used as an aqueous solution of the resin. The solids content of the aqueous solution is in the range 50 to 75% by weight. Solids contents below 50% are not used because they contain too much water which reduces the effectiveness of the binder. Solids contents above 75%, are not used because the viscosity becomes too high.

The phenol-formaldehyde resins used in this invention have a weight average molecular weight ($\overline{M}_w$) of from 600 to 1500. Resins with $\overline{M}_w$ outside this range give products which are relatively weak or build up strength more slowly. We have, to date, obtained best results using resins having $\overline{M}_w$ in the range 700 to 1100.

The resins used in this invention are potassium alkaline phenol-formaldehyde resins by which is meant that the alkali in the resin is potassium alkali. This alkali will usually be present in the resin during manufacture but can be added to the resin subsequently as KOH, preferably in aqueous solution of suitable strength. The alkalinity of the resin is expressed in terms of its KOH content and specifically by the molar ratio of KOH to the phenol in the resin. Other alkalis are not expressly excluded and may be present in minor amounts but will not be specifically added because they give products having lower strength.

The molar ratio of KOH: phenol in the resin solution is in the range 0.2:1 to 1.2:1 preferably 0.3:1 to 1:1. Outside this range the products have relatively poor strength and, above the top range limit, the resin is hazardously alkaline. We have obtained best results using resin solutions having a KOH: phenol molar ratio in the range 0.4 to 0.6.

The resins used have a formaldehyde to phenol molar ratio of from 1.2:1 to 2.6:1, preferably 1.5:1 to 2.2:1. Lower ratios are not used because the resins are relatively unreactive. Higher ratios are not used because the resins produced contain undesirably high levels of unreacted formaldehyde and give products having lower strength.

It is a subsidiary aspect of this invention that the resin used satisfies the following criteria:

(a) $\overline{M}_w$ from 700 to 1100;
(b) KOH: phenol molar ratio 0.4:1 to 0.6:1 and
(c) formaldehyde: phenol molar ratio 1.5:1 to 2.2:1

A silane is included in the binder to improve strength. Amounts as low as 0.05% by weight on the weight of resin solution provide a significant improvement in strength.

Increasing the amount of silane gives greater improvements in strength up to about 0.6% by weight on the resin solution. Higher silane concentrations are not preferred because of added cost. Further, because the silane typically used is γ-aminopropyltriethoxy silane which contains nitrogen, use of excess silane may increase the risk of pinholing defects and for these reasons amounts in excess of 3% by weight on the resin solution are not used.

The binder and particulate refractory material can be mixed and formed by conventional techniques. The vented core and mould boxes used can also be of conventional type as are used in prior art gassing systems. The binder is cured, according to the present invention, by gassing with a $C_1$ to $C_3$ alkyl formate, very preferably methyl formate. The alkyl formate curing catalyst will not usually be used as a pure gas but as a vapour or aerosol in an inert carrier gas. By inert carrier gas we mean a gas which does not react with the formate catalyst or have an adverse effect on the curing reaction or the properties of the product. Suitable examples include air, nitrogen or carbon dioxide.

The gassing catalyst is a $C_1$ to $C_3$ alkyl formate preferably dispersed in a carrier gas as vapour or an aerosol. Other esters e.g. formate esters of higher alcohols such as butyl formate, and esters of $C_1$ to $C_3$ alcohols with higher carboxylic acids such as methyl and ethyl acetates, are not effective as gassing catalysts. Methyl formate is significantly more active as a catalyst than ethyl formate which is better than the propyl formates. The reasons for the catalytic activity of the $C_1$ to $C_3$ alkyl formates and, within this group, the marked superiority of methyl formate, are not clear. The relative volatility of these compounds enables their use as gassing catalysts. This is especially true of methyl formate which is a volatile liquid having a boiling point at atmospheric pressure of 31.5° C. At ambient temperatures (below 31.5° C.), typically 15° to 25° C., it is sufficiently volatile that passing carrier gas through liquid methyl formate (maintained at ambient temperature) gives a concentration of methyl formate vapour in the carrier gas sufficient to act as catalyst to cure the binder. Ethyl and the propyl formates are less volatile than the methyl ester, having boiling points in the range 54° to 82° C. at atmospheric pressure.

In order to entrain sufficient of these esters in the gas phase to enable effective catalysis, we have found it appropriate to heat the esters to near their boiling point and use a stream of carrier gas preheated to e.g. 100° C.

An alternative to true vaporization is to form an aerosol in the carrier gas. Methyl formate is so volatile as to make this impractical. Using ethyl and propyl formates it is desirable to pre-heat them to enhance even distribution in the core or mould during gassing.

As is indicated above, methyl formate is the most active catalyst and, by virtue of its volatility, is the easiest to use. Accordingly, the use of methyl formate in a stream of inert carrier gas as the gassing catalyst forms a particular aspect of this invention. A further practical advantage of these formate esters, especially methyl formate is their relative low toxicity and the fact that their toxicity is well understood.

The concentration of the formate catalyst in the carrier gas is preferably at least 0.2% by volume and typically from 0.5 to 5% by volume. The total amount of catalyst used will typically be from 5 to 60% preferably from 15 to 35%, by weight on the weight of the resin solution. The time required for adequate gassing depends on the size and complexity of the core or mould and on the particular resin used. It can be as short as 0.1 secs but more usually is in the range 1 sec to 1 min. Longer times e.g. up to 5 mins can be used if desired or for large moulds or cores. After gassing the core or mould is stripped from the box. Sufficient time must elapse to permit the strength of the mould or core to build up to enable stripping without damage. Production speed can be enhanced by purging the mould or core box with a suitable inert gas such as air which removes residual catalyst vapour and water and other by-products of the curing reaction.

The amount of resin solution used as binder is from 0.5 to 8%, preferably 1 to 3%, by weight on the weight of the refractory particulate material. Use of lower amounts of binder gives cores of poor strength. Higher amounts of binder give no significant advantage and give generally poorer breakdown on casting and increase the difficulty of sand recovery.

The following Examples illustrate the invention.

The techniques used in the Examples are described below:

Manufacture of phenol formaldehyde resin solutions

100% phenol was dissolved in 50% aqueous KOH in an amount corresponding to the desired KOH:phenol molar ratio (from 0.2 to 1.2). The solution was heated to reflux and 50% aqueous formaldehyde was added slowly, whilst maintaining reflux, in an amount corresponding to the desired formaldehyde:phenol molar ratio (1.6, 1.8 or 2.0). The reaction mixture was maintained under reflux until it attained a pre-determined viscosity corresponding to the desired value of $\overline{M}_w$. (If desired the solids content can be adjusted by distillation, but this is not usually necessary, a further advantage of the invention. In some cases minor amounts of KOH solution were added to adjust the KOH:phenol ratio, but this would not be necessary in full scale production.) The resin solution was cooled to 40° C. and 0.4% by weight on the weight of the resin solution of γ-aminopropyl triethoxy silane was added.

Testing of resins (a) viscosity—measured using an Ostwald (U-tube) viscometer at 25° C.

(b) solids content—measured by heating a weighed sample (2.0±0.1 g) in an air circulating oven for 3 hrs at 100° C.

(c) Molecular weight $\overline{M}_w$)—measured using gel permeation chromatography. Samples were prepared by precipating resin from the resin solution by adding $H_2SO_4$; separating, washing and drying the precipitate and dissolving it in tetrahydrofuran.

Preparation of foundry sand core mix 1 kg of the selected sand was charged into a Fordath laboratory core mixer and mixed for 2 mins, with 20 g phenol-formaldehyde resin prepared as described above. The mix was discharged into a tin and sealed immediately to prevent evaporation of water.

Preparation of test foundry cores

5×5 cm cylinder compression test pieces were prepared by the standard procedure recommended by I.B.F. working party P but using a perforated bottom plate of the cylinder with a recess which could be connected to a source of negative pressure. The top of the cylinder was sealed with another perforated plate connected to a bubbler containing liquid methyl formate at ambient temperature. When vacuum was applied to the bottom plate air was bubbled through the methyl formate and the ester vapour conveyed in the air stream through the sand resin mix in the cylinder core box. Compression strength was determined on the resultant cores after storing at 20° C., 50% relative humidity for 1 min, 5 mins, 1 hr. 2 hrs. 3 hrs. and 24 hrs. Initial tests indicated that 30 secs. was sufficient time to produce the optimum strength and this was used as a standard in the Examples below.

EXAMPLE 1

Test cores were made using solutions of resins having the following properties:
formaldehyde:phenol molar ratio—2.0
KOH:phenol molar ratio from—0.4 to 0.8
$\overline{M}_w$—960 or 1000
Solids content—63.5%
0.4% by weight on the resin solution of γ-aminopropyltriethoxy silane was added. The sand used was Chelford 50 and the amount of resin was 2% by weight resin solution on the sand. The results are set out in Tables 1 and 2. Table 1 gives the results for resins with $\overline{M}_w=960$ and Table 2 for resins with $\overline{M}_w=1000$.

The data in the table show that cores of adequate strength can be made but that the strength falls of somewhat at KOH:phenol ratios greater than 0.6.

TABLE 1

| Test No. | 1 | 2 | 3 | 4 | 5 |
|---|---|---|---|---|---|
| KOH:Phenol | 0.4 | 0.5 | 0.6 | 0.7 | 0.8 |
| Viscosity (cP) | 500 | 390 | 313 | 250 | — |

TABLE 1-continued

| Test No. | 1 | 2 | 3 | 4 | 5 |
|---|---|---|---|---|---|
| Compression Strength (MPa) | | | | | |
| 1 min | 1.2 | 2.2 | 2.6 | 2.6 | 2.9 |
| 5 min | 1.9 | 3.6 | 3.1 | 3.0 | 3.0 |
| 1 hr | 2.2 | 3.4 | 3.5 | 3.2 | 3.0 |
| 3 hr | 2.1 | 3.9 | 4.0 | 3.5 | 3.1 |
| 24 hr | 3.0 | 4.3 | 4.8 | 3.2 | 2.2 |

TABLE 2

| Test No. | 6 | 7 | 8 | 9 |
|---|---|---|---|---|
| KOH:Phenol | 0.4 | 0.5 | 0.6 | 0.7 |
| Viscosity (cP) | 688 | 500 | 375 | — |
| Compression Strength (MPa) | | | | |
| 1 min | 1.7 | 2.4 | 2.9 | 2.9 |
| 5 min | 2.4 | 3.2 | 3.2 | 3.3 |
| 1 hr | 2.4 | 3.4 | 3.7 | 3.6 |
| 3 hr | 3.2 | 4.1 | 3.2 | 3.4 |
| 24 hr | 4.4 | 4.8 | 3.9 | 2.9 |

EXAMPLE 2

Test cores were made using solutions of resins having the following properties:
formaldehyde:phenol molar ratio—2.0
KOH:phenol molar ratio—0.65
$\overline{M}_w$ from—718 to 1050
Solids content—66%
0.4% by weight γ-aminopropyltriethoxy silane was added to the resin solution. The sand used was Chelford 50 and the amount of resin solution used was 2% by weight on the sand. The experiment was reported using similar solutions to which 50% KOH solution was added to increase the KOH: phenol ratio to 0.85. The solids contents of these resin solutions were 64%. The results are set out in Table 3. The data for the resins with KOH:phenol=0.65 is in the (a) columns and for resins with KOH:phenol=0.85 in the (b) columns. As in Example 1 the use of higher KOH:phenol ratios gives inferior results especially at the higher values of $\overline{M}_w$.

TABLE 3

| | Test No. | | | | | | | |
|---|---|---|---|---|---|---|---|---|
| | 10 | | 11 | | 12 | | 13 | |
| | $\overline{M}_w$ | | | | | | | |
| | 718 | | 849 | | 966 | | 1050 | |
| | a | b | a | b | a | b | a | b |
| KOH:Phenol | 0.65 | 0.85 | 0.65 | 0.85 | 0.65 | 0.85 | 0.65 | 0.85 |
| Solids (%) | 66 | 64 | 66 | 64 | 66 | 64 | 66 | 64 |
| Viscosity (cP) | 107 | 81 | 220 | 111 | 320 | 144 | 405 | 167 |
| Compression Str. (MPa) | | | | | | | | |
| 1 min | 2.7 | 2.3 | 2.9 | 2.2 | 2.6 | 2.0 | 1.9 | 2.0 |
| 5 min | 3.4 | 2.7 | 3.3 | 2.6 | 3.0 | 1.1 | 2.2 | 2.0 |
| 1 hr | 3.0 | 2.7 | 3.5 | 2.7 | 2.7 | 2.2 | 2.2 | 2.0 |
| 3 hr | 3.6 | 3.2 | 3.5 | 2.6 | 2.9 | 1.7 | 1.9 | 2.0 |
| 24 hr | 4.5 | 2.9 | 3.5 | 1.1 | 1.8 | 0.8 | 1.2 | 0.9 |

EXAMPLE 3

Resins with varying properties were used to make test cores as described above. The sand used was Chelford 50, the amount of resin solutions was 2% by weight on the sand and all the resin solutions contained 0.4% by weight γ-aminotreithoxy silane. The results are set out in Table 4.

TABLE 4

| Test No. | 14 | 15 | 16 | 17 | 18 | 19 | 20 | 21 |
|---|---|---|---|---|---|---|---|---|
| $\overline{M}_w$ | 850 | 850 | 850 | 1000 | 1000 | 1000 | 1000 | 1000 |
| KOH:Phenol | 0.72 | 0.72 | 0.45 | 0.34 | 0.57 | 0.68 | 0.85 | 1.02 |
| formaldehyde:phenol | 1.6 | 1.6 | 1.6 | 2.0 | 2.0 | 2.0 | 2.0 | 2.0 |
| Solids (%) | 60.2 | 66.2 | 65.4 | 64.0 | 64.0 | 64.0 | 64.0 | 64.0 |
| Viscosity (cP) | 277 | 414 | 600 | — | — | — | 150 | — |
| Compression Strength (MPa) | | | | | | | | |
| 1 min | 2.4 | 2.3 | 1.8 | 0.9 | 2.7 | 2.5 | 2.3 | 1.6 |
| 5 min | 2.5 | 2.4 | 2.5 | 2.7 | 2.8 | 2.7 | 2.4 | 1.8 |
| 1 hr | 2.5 | 2.7 | 2.0 | 2.3 | 2.8 | 2.8 | 2.4 | 2.0 |
| 3 hr | 2.5 | 3.2 | 2.1 | 2.2 | 3.9 | 3.2 | 2.3 | — |
| 24 hr | 1.2 | 3.0 | 3.5 | 3.1 | 4.5 | 2.2 | 1.8 | 1.9 |

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for the production of foundry moulds or cores which comprises:

mixing a granular refractory material with from 0.5% to 8% based on the weight of the refractory material of a binder solution, said binder solution comprising (i) an aqueous solution of a potassium alkali phenol-formaldehyde resin, said aqueous solution having a solids content of from 50% to 75% and said resin having a weight average molecular weight ($\overline{M}_w$) of from 600 to 1500, a formaldehyde:phenol molar ratio of from 1.2:1 to 2.6:1 and a potassium hydroxide:phenol molar ratio of from 0.2:1 to 1.2:1 and (ii) at least one silane in an amount of from 0.05% to 3% based on the weight of said aqueous solution, discharging the mixture into a vented core or mould box, and gassing the formed mixture with at least one $C_{1-3}$alkyl formate to cure the binder.

2. The process of claim 1 wherein the refractory material is selected from the group comprising silica sand, quartz, chromite sand, zircon, olivine sand or beach sands containing shell fragments.

3. The process of claim 2 wherein the refractory material is chromite sand, olivine sand or beach sands containing shell fragments.

4. The process of claim 1 wherein the $\overline{M}_w$ of said resin is from 700 to 1100.

5. The process of claim 1 wherein the potassium hydroxide:phenol molar ratio is from 0.3:1 to 1:1.

6. The process of claim 4 or 5 wherein the potassium hydroxide:phenol molar ratio is from 0.4:1 to 0.6:1.

7. The process of claim 1 wherein the formaldehyde:phenol molar ratio is from 1.5:1 to 2.2:1.

8. The process of claim 6 wherein the formaldehyde:phenol molar ratio is from 1.5:1 to 2.2:1.

9. The process of claim 1 wherein said refractory material is mixed with from 1% to 3% based on the weight of the refractory material of said binder solution.

10. The process of 1 wherein the mixture is gassed with from 5% to 60% based on the weight of the aqueous solution of said alkyl formate.

11. The process of claim 10 wherein the mixture is gassed with from 15% to 35% based on the weight of the aqueous solution of said alkyl formate.

12. The process of claim 11 wherein said alkyl formate is methyl formate.

13. The process of claim 1 or 12 wherein said alkyl formate is dispersed in a carrier gas.

14. The process of claim 13 wherein the concentration of said formate in the carrier gas is from 0.5% to 5% by volume.

* * * * *